Figure 1:
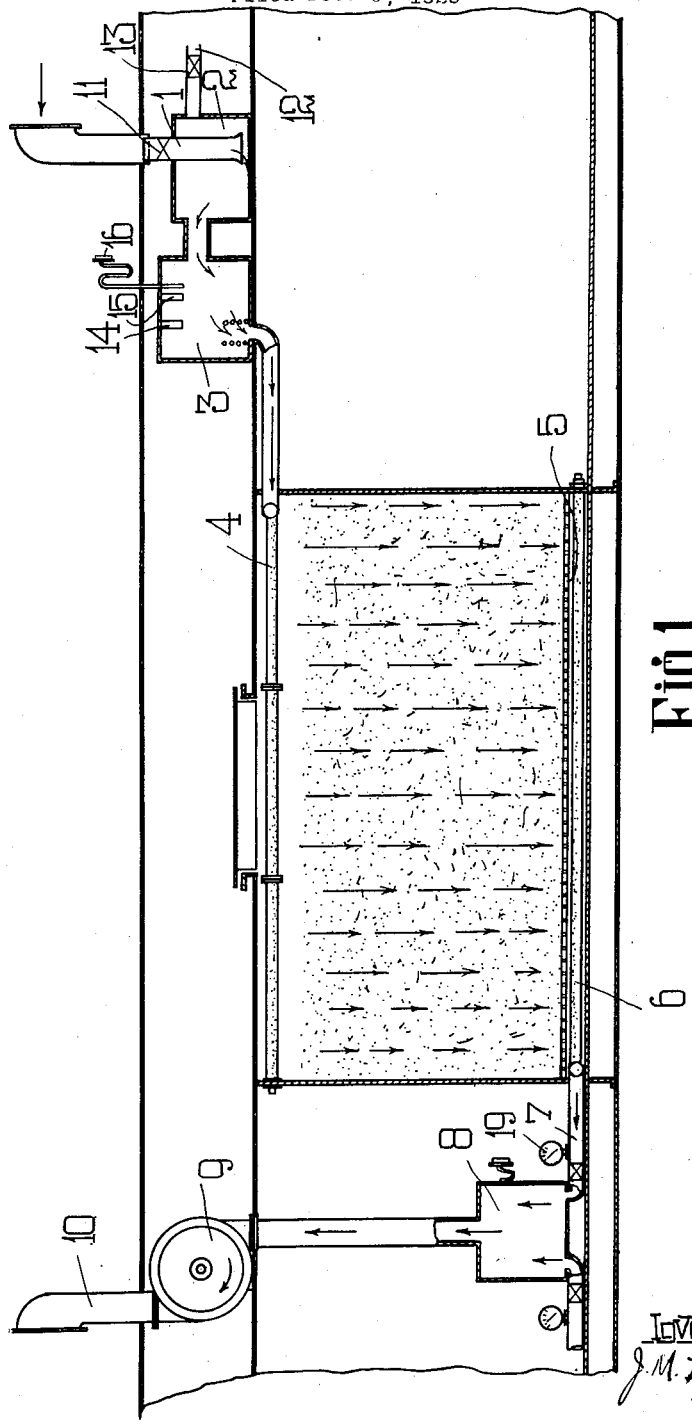

March 23, 1926.

J. McL. THOMPSON 1,578,218

METHOD OF STORAGE OF VEGETABLE PRODUCE

Filed Dec. 5, 1925　　2 Sheets-Sheet 2

Inventor
J. M. Thompson
by
A. B. Foster
Attorney.

Patented Mar. 23, 1926.

1,578,218

UNITED STATES PATENT OFFICE.

JOHN McLEAN THOMPSON, OF LIVERPOOL, ENGLAND.

METHOD OF STORAGE OF VEGETABLE PRODUCE.

Application filed December 5, 1925. Serial No. 73,426.

*To all whom it may concern:*

Be it known that I, JOHN McLEAN THOMPSON, a subject of the King of Great Britain, residing in Liverpool, in the county of Lancaster and Kingdom of England, have invented certain new and useful Improved Method of Storage of Vegetable Produce, of which the following is a specification.

This invention relates to an improved method of storage of vegetable produce, especially living produce such as fruits or vegetables. The invention will be described with reference to the storage of such produce during transport in the holds of ships. The invention is also applicable to storage for other purposes.

It is found in practice that when nuts or fruit are transported in ships' holds, very serious damage is caused by bacterial, fungal and physiological diseases, and although to a certain extent some of these diseases can be prevented by cold storage, this method of preservation has disadvantages of its own.

According to my invention I have devised a method of storage at substantially atmospheric temperatures by which it is possible to store fruit and to keep it in good condition for a length of time which is quite unprecedented in practice.

For example, when dealing with apples which are commercially termed "grade C," i. e. apples of relatively low keeping power, I find that by my method I have succeeded in storing them in good condition for 6 weeks at substantially atmospheric temperature, whereas according to the ordinary practice of commerce, it would be impossible to keep such fruit at temperatures around 15° C. for over a week after which time the fruit would become diseased or shrivelled.

My invention is based on a prolonged study of the physiology of the vegetable produce and broadly speaking it consists in adjusting the temperature and composition of the atmosphere surrounding the fruits so as to correspond with the requirements of reduced respiration characteristic of dormancy. Hitherto, various proposals have been made to the effect that vegetable produce may be aerated. The general idea underlying such proposals is usually mere "ventilation" or drying and the physiological needs of produce such as fruits or vegetables have not been adequately considered.

Now according to my invention, the regulation of the flow and composition of air is crucial. For example, in dealing with apples good results are obtained at a temperature of 15° C. an average humidity of 65%, a carbon dioxide content of 0.04% when the breathing or respiration of the produce is exceedingly slow and corresponds to that reduced rate which is characteristic of dormancy.

If now the carbon dioxide content is allowed to increase, the rate of respiration increases with it and this produces further carbon dioxide which again further accelerates the rate of respiration; in other words the production of carbon dioxide is auto-accelerated. The temperature then rises and rapid deterioration takes place through physiological, bacterial or fungal diseases.

On the other hand, if the humidity is kept too low, evaporation takes place and the fruit shrivels while various physiological diseases (e. g. "Jonathan spot" in apples) are also produced.

It is necessary however to maintain the carbon dioxide content, the temperature and the humidity within such limits as correspond with said reduced respiration I have described. In practice, this object can best be achieved by careful regulation of the rate of flow which as a matter of fact must be particularly slow. Taking apples which without aeration are rapidly attacked by fungal and other diseases in a week, I find that they can be stored for many weeks if the surrounding atmosphere is changed once in every 8 hours, but if the surrounding atmosphere is changed as often as once every half to one hour, the fruit becomes shrivelled and physiological diseases set in. Accordingly it is impossible to achieve success if too much air or too little air is employed, but the deciding factors are to be found in the temperature and composition of the atmosphere in the hold although these do vary with the rate of flow of the air.

Having described the physiological conditions to be fulfilled, I will hereinafter give two definite examples applied to brazil nuts and apples and I will add further information dealing with other fruits by way of example, but in treating any particular fruit, tests should be made to control the various conditions in accordance with the principles I have described in the light of the examples I have given.

Figure 2:
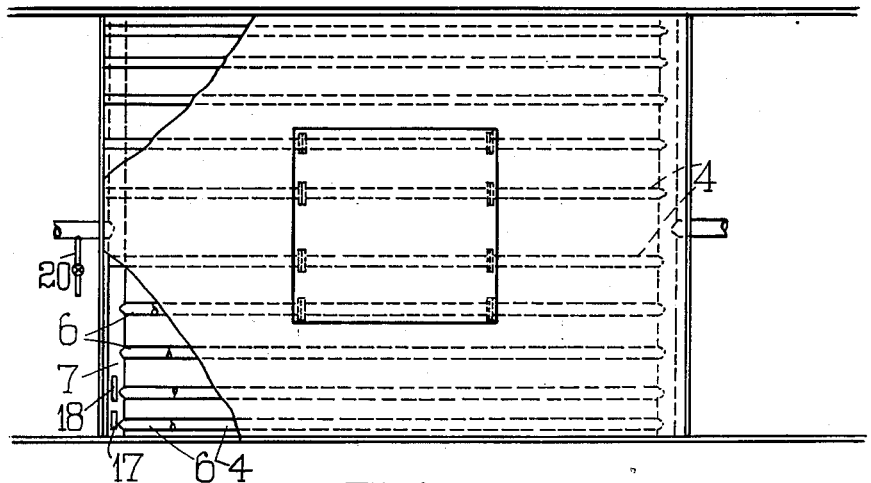
Figure 3:
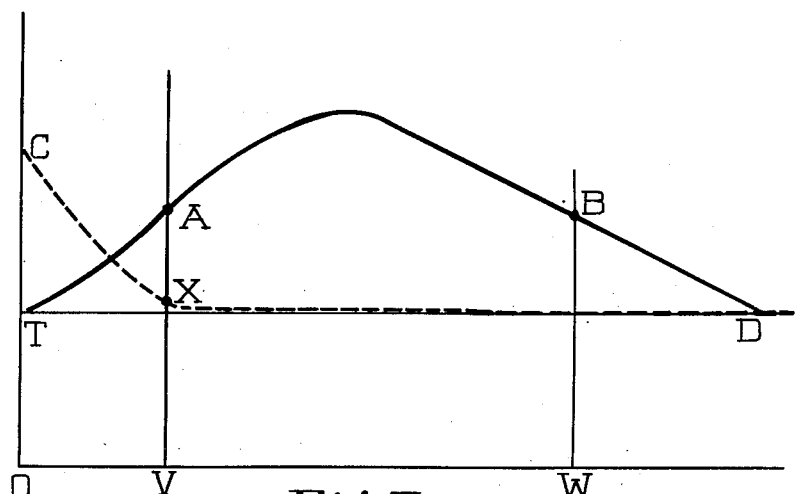

The invention will be described with reference to the accompanying drawings which indicate a system of treatment for ships' holds. In these drawings Figure 1 is an elevation and Figure 2 is a plan. Fig. 3 is a graphic showing of the relation of volume of air passed through to temperature and $CO_2$ content of the air exit, under different conditions.

1 is the air inlet pipe having a valve 11. 12 is an inlet for dry air (e. g. air which has passed over the refrigerating pipes of the ships' cooling system and then has been reheated) with a valve 13. The air is led to a mixing chamber 2 and collecting chamber 3 and provided with wet and dry bulb thermometers 14 and 15 and a manometer 16.

The air passes to the perforated distribution pipes 4 arranged at the top of the hold below the deck. Pipes are arranged so that when the hatches are removed the produce will be accessible. The pipes are provided with perforations increasing in size as the distance from the inlet point increases.

At the bottom of the hold there is a perforated false floor 5 and there is a plurality of perforated collecting pipes 6 leading to a common main 7, a collecting chamber 8, a fan 9 and an outlet pipe 10. 17 and 18 (Fig. 2) are wet and dry bulb thermometers and 19 is a manometer. 20 is a tube for use in taking samples for carbon dioxide tests.

If the hold is large, vertical bulkheads may be provided to divide it up to ensure more uniform ventilation and each portion may be connected separately to the collecting chambers.

The composition of the air is controlled by operating valves in accordance with the readings of the thermometers and the percentage of carbon dioxide. It is essential—

(1) to keep the percentage of carbon dioxide low, (2) to prevent deposition of liquid inside the hold, i. e. the atmosphere must be below the dew point, and (3) no undue rise in temperature must occur within the hold.

When several holds are being ventilated, the valves must be controlled carefully in accordance with the manometer readings so that each hold receives its due proportion of air. The flow is controlled by the manometer reading and by the capacity of the fan in the manner which will be apparent to those familiar with the use of fans.

In my experiments I have found it of great importance to pass the air in a downward direction since this appears to ensure more satisfactory results than flow in any other direction.

In treating Brazil nuts in a very carefully controlled laboratory experiment I took a chamber 9 feet high by 3 feet square filled with infected nuts. By passing 45 cubic feet of air per hour through the nuts in a downward direction, I was able to transport them for 23 days with very little damage through disease. The temperature of the outside air was about 15–20° C. and the humidity was about 64%: the temperature inside the chamber was a few degrees higher. Thus for Brazil nuts, it will generally be sufficient to pass about 12 cubic feet of air per 24 hours per cubic foot of hold space, but this volume will depend on the percentage of humidity, the temperature and other conditions and it must be controlled by ascertaining that the specified conditions are made.

In another experiment, I treated 30 cases of apples (360 apples per case) at an average temperature of about 15° C. an average carbon dioxide content of 0.04% and an average humidity of 65–66%. The outside air was at a temperature of 12° C. and a humidity of 60%. The flow of air was 25 cubic feet per hour so that the atmosphere around the fruit was completely replaced every 8 hours.

In treating ripe oranges, lemons and grape fruit, the flow of air should be 1 cubic foot per case of 360 fruits; the average temperature should be 13–18° C., the humidity 68–70% and the carbon dioxide content a maximum of 0.5% (in the hold). Onions are treated similarly. For unripe oranges, lemons and grape fruit the flow should be increased to 1½ feet per case. Temperature 14–20° C., humidity 70–72% and carbon dioxide content a maximum of 0.8% (in the hold).

The above examples are purely illustrative and the principle of my invention may be applied to other kinds of fruit and vegetable produce. In applying the invention to other kinds of vegetable produce, careful tests will be necessary based upon the following general description of the changes which occur on varying the conditions prevailing in the hold.

Assuming that a ship's hold is full of apples, for example, and the flow of air is zero, the normal respiration of the fruit will soon exhaust all the available oxygen and the carbon dioxide expired by the fruit will rise to a high concentration. Abnormal respiration will follow, and degradation of the fruit will begin. If the fruit is left in contact with this high percentage of carbon dioxide, diseases will attack it and the fruit will rot on prolonged storage.

Now if a slow flow of air is uniformly passed through the hold, the percentage of carbon dioxide will fall and slow respiration of the fruit will take place. This respiration will cause the air in the hold to rise in temperature.

When the flow of air has increased to a certain (still very low) volume per hour, the carbon dioxide will be nearly all swept away and the concentration will be less than 0.1% and indeed in a favourable case, it will be very close to the percentage of carbon dioxide in ordinary air. Even this small rate of respiration however will be sufficient to raise the temperature of the air.

It is at this point that the flow of air should be maintained, i. e. sufficient but only just about sufficient to keep the percentage of carbon dioxide at the desired low figure.

To assist in determining this point, it may be further added that if the flow of air is increased beyond the optimum figure, the temperature will rise instead of falling as might have been expected. This rise is due to the increased respiration caused by additional supply of oxygen. On further increasing the flow of air, the temperature would rise to a maximum but on still further increasing the flow of air to a very rapid rate, the temperature will then begin to fall because in spite of the great quantity of heat liberated by the abnormally increased respiration of the fruit, the cooling effect of the large volume of air will now predominate. Thus it will be seen that if the outside air is at 12° C., there will be two rates of flow of air for which the temperature inside the hold will be 17° C. It is the lower of these two rates which is the optimum according to the present invention. For this optimum rate, if the flow of air is decreased the carbon dioxide will rise, while if the flow of air is increased the temperature will probably rise.

At the other rate of flow corresponding with say 17° C. in the hold, further increase of flow will lower the temperature and at this higher rate of flow "break-down" of the apples will occur owing to excessive metabolism of the reserve supply of sugar, etc. Such excessive metabolism due to a high rate of respiration must be rigorously avoided.

From the above considerations, therefore, it will be easy, by slightly increasing the rate of flow from zero, to determine the point at which the carbon dioxide is kept low without causing excessive respiration. At this point the conditions are those which I define as maintaining the reduced respiration characteristic of dormancy.

It should be added that in the above discussion, I have assumed that the temperature is maintained at a reasonable level preferably between about 12-20° C., though this varies somewhat for the different produce and the humidity should be such as to prevent excessive evaporation on the one hand while on the other hand avoiding deposition of liquid water.

If the invention is operated when the surrounding air is very cold, the respiration of the fruit itself may be caused to maintain the slightly higher temperature within the closed chamber.

If on the other hand the invention is operated in a hot moist atmosphere, the temperature may be brought down if necessary by mixing cold dry air with the atmospheric air introduced into the hold.

The result of the treatment I have described is to maintain the fruit in perfect health, but in a dormant condition. In other words, metabolism of the reserve supplies of sugar etc. is reduced to the lowest possible limit consistent with the maintenance of life. It is important to maintain the life of the fruit and it is for this reason that the temperature ought not to be reduced too low. For example fruit which has been kept in cold storage is "dead" and although it comes out of cold storage in very perfect condition, it does not keep well on exposure to ordinary atmospheric conditions. Fruit which has been kept dormant according to my invention however, is still alive and will keep admirably under ordinary atmospheric conditions.

Figure 3 shows the above described relationships diagrammatically. The volume of air is measured along the axis OW, the temperature and carbon dioxide concentration along the axis OC. The line TD represents atmospheric temperature and atmospheric percentage of carbon dioxide. The temperatures are represented by the full curve and carbon dioxide concentration by the dotted curve. At zero flow of air the temperature is atmospheric at point T and the carbon dioxide is high at C. On increasing the flow of air, at a volume V the carbon dioxide has fallen to X while the temperature has risen to A. This is the optimum flow of air.

On increasing the flow of air, the temperature rises to a maximum and then decreases. The flow of air W (when the temperature B is the same as temperature A) would be unsuitable because the rate of respiration would be too high. Thus the flow must be sufficient to prevent accumulation of carbon dioxide but insufficient for normal respiration.

It will be seen that the state of affairs according to the present invention is exactly opposite to what would be expected if the air merely ventilated the produce or cooled it, for in such a case a flow of air greater than W would be employed so as to give a temperature lower than B.

The terms "fruit" and "vegetable produce" are each hereinafter employed to designate edible parts of plants, in which respiration normally would occur when freely exposed to atmospheric air.

I declare that what I claim is:—

1. The method of treating vegetable produce in bulk in a closed space which comprises continuously passing air therethrough in quantity sufficient to reduce the percentage of carbon dioxide in said space to below 0.1% and near the percentage of carbon dioxide in normal air but insufficient for normal respiration and regulating the temperature and humidity to avoid shrivelling.

2. The method of treating fruit in bulk which comprises storing it in a closed space in an atmosphere containing less than 0.1% of carbon dioxide and of a humidity in the neighborhood of 65% and maintaining the temperature of the air within said space at about 12–20° C.

3. In the art of storing fruit, the herein described improvement which comprises maintaining the fruit in a slowly aerated space, while at a temperature between approximately 12° and 20° C., the amount of aeration being insufficient for maintaining normal respiration of the fruit, but sufficient to prevent the carbon dioxide in the ambient atmosphere from reaching 0.1%.

4. In the art of storing fruit, the herein described improvement which comprises maintaining the fruit in a slowly aerated space, while at a temperature between approximately 12° and 20° C., the amount of aeration being insufficient for maintaining normal respiration of the fruit, but sufficient to prevent the carbon dioxide in the ambient atmosphere from reaching 0.1%, said amount of aeration being such that if slightly increased the temperature about the fruit would rise somewhat and if further substantially increased the temperature about the fruit would fall somewhat, and the amount of aeration further being such that if decreased in any substantial amount, the carbon dioxide in the ambient atmosphere would increase substantially; thereby maintaining in the fruit a condition of dormancy.

5. A method of storing fruit which comprises holding the fruit in a closed space, and continuously maintaining in said space, an atmosphere containing less than 0.1% of carbon dioxide, and maintaining therein a humidity of about 65%, such conditions being maintained by slow aeration of the said space.

In witness whereof, I have hereunto signed my name this 25th day of November 1925.

JOHN McLEAN THOMPSON.